Patented July 24, 1951

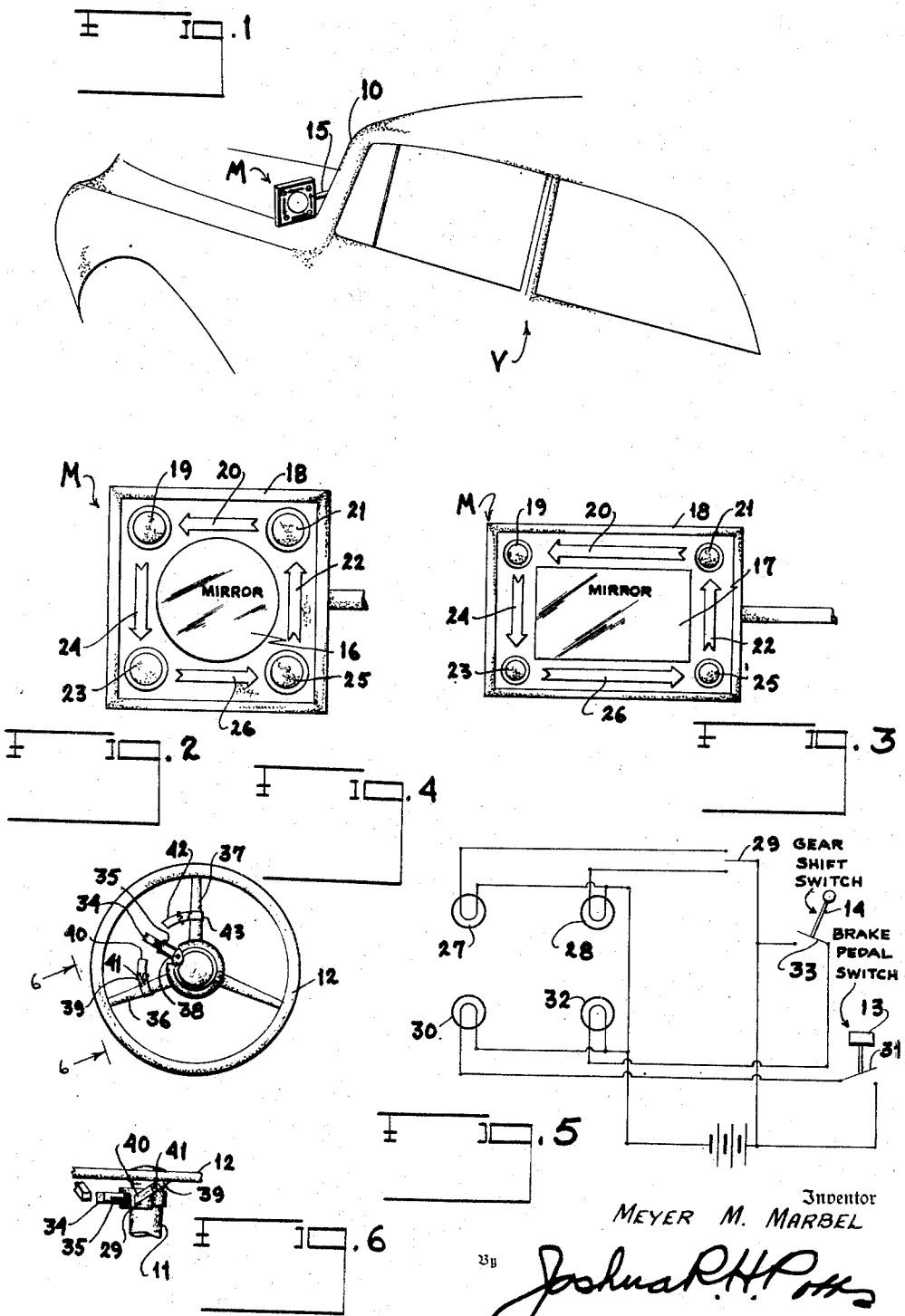

2,561,582

UNITED STATES PATENT OFFICE 2,561,582

DIRECTIONAL MIRROR FOR MOTOR VEHICLES

Meyer M. Marbel, Chicago, Ill.

Application June 11, 1949, Serial No. 98,586

7 Claims. (Cl. 177—329)

The present invention deals with the rear-vision mirrors commonly mounted at the left-hand side of an automobile and is concerned primarily with a rear-vision mirror which includes directional signals for indicating certain impending operations on the part of the driver of the vehicle in which the mirror is installed.

At the present time, considerable effort is being expended by inventors to the end of improving the safety factor in motor vehicle operation. One phase of this effort which has been receiving a considerable amount of attention during recent years is to provide equipment for advising an operator in the rear of the car in which the equipment is installed of the exact nature of certain impending deviations from straight car driving. Thus, there have been signalling devices provided for indicating when a left turn is to be made, the making of a right turn or when the vehicle is to be brought to a stop. The present invention follows this trend in providing new and highly improved equipment of this general nature.

The invention has in view as its foremost objective the provision of a rear-vision mirror that is installed in a frame of rectangular formation and each corner of which carries an indicating light together with a directional indicator such as an arrow. In accordance with the present invention, the light at one corner is intended to designate the making of a left turn, the light at another corner the making of a right turn, the light in still another corner, the bringing of the vehicle to a stop, and the light at the last corner is to indicate that the vehicle is to be backed up.

In carrying out this idea in a practical embodiment, the rear-vision mirror is located at the customary place where it may be easily seen by an operator immediately in back of the car in which the mirror is installed.

Another highly important object of the invention is the provision, in a rear-vision mirror of the type indicated, of a switch which is intended to control the signals for the right and left-hand turns and which switch is so associated with the steering wheel of the car as to render its operation automatic, coincident with the making of a turn by the car. Thus, if the steering wheel is turned to make a left-hand turn, the signal for the left turn is automatically illuminated. Likewise, if the steering wheel is turned to make a right turn, the signal for the right turn is automatically illuminated.

Still another object of the invention is to provide, in a rear view directional mirror of the type indicated, a stop signal having a control switch that is mechanically connected to the brake pedal of the car so that when the brake pedal is applied, the stop signal is illuminated.

Still another object of the invention is to provide, in a rear view directional mirror of the type indicated, a reverse signal having a switch that is mechanically connected to the gearshift lever of the car so that when the car is put in reverse, the reverse signal will be illuminated.

Various other more detailed objects and advantages of the invention such as arise in connection with carrying out the above noted ideas in a practical embodiment will, in part become apparent, and in part be hereinafter stated as the description of the invention proceeds.

The invention, therefore, comprises a rear view directional mirror intended for installation on a motor vehicle and which consists essentially of a rectangular framework that carries the mirror proper and each corner of which is provided with a signal with the respective corners designating "left turn," "right turn," "stop," and "reverse." The right and left turn signals are included in the circuit of a control switch that is mechanically operated by the steering wheel of the car. The stop signal is included in a circuit having a switch operated by the brake pedal and the reverse signal is included in a circuit having a switch operated by the gearshift lever.

For a full and more complete understanding of the invention, reference may be had to the following description and accompanying drawing wherein:

Figure 1 is a perspective view showing a portion of a motor car in phantom with a rear view directional mirror designed in accordance with the precepts of this invention installed thereon.

Figure 2 is a front elevational view of the mirror and signal structure.

Figure 3 is a similar elevation of a slightly modified form of mirror and signal structure.

Figure 4 is a top plan view of a steering wheel of a car having a control switch associated therewith together with operating instrumentalities therefor in accordance with this invention.

Figure 5 is a wiring diagram depicting the circuits for the several signals; and Figure 6 is a detailed fragmentary view showing in side elevation of the steering wheel, switch, and operating instrumentalities therefor.

Referring now to the drawing wherein like reference characters denote corresponding parts and first more particularly to Figure 1, a motor vehicle is represented in phantom in Figure 1 and designated V. The motor vehicle V includes all the usual operating parts and mechanism contained in the conventional automobile. Those parts with which this invention is concerned are the body represented at 10, the steering column 11 carrying the steering wheel 12 (Figure 6), a brake pedal indicated at 13, and a gearshift lever 14 (Figure 5).

Outstanding from the body 10 at the left-hand side and immediately in front of the place normally occupied by the driver is an arm 15 which carries a rear view mirror assembly that is referred to in its entirety by the reference character M.

The mirror assembly M may take either of the two forms depicted in Figure 2 or Figure 3. In both cases, the mirror assembly M includes a framework that is rectangular and definitely defines four corners. In the form shown in Figure 2, the frame is substantially square and encloses a circular mirror 16. In the form shown in Figure 3, the frame is of an oblong form and encloses a similarly shaped mirror element 17.

The frame is identified at 18 and mounted in the upper left-hand corner thereof is a signal 19 that is adapted to be illuminated by a light bulb therebeneath. Associated with this signal 19 is an arrow 20 and when this signal 19 is illuminated, either alone or with the arrow 20, it indicates that the driver of the car is to make a left turn. Positioned in the upper right-hand corner is another signal 21 with which is associated an arrow 22. This signal 21 either alone or together with the arrow 22 is adapted to be illuminated to indicate the making of a right turn. At the lower left-hand corner, there is a signal 23 with which is associated an arrow 24 and when the signal 23 is illuminated, it indicates that the vehicle is to be brought to a stop. In the lower right-hand corner there is a signal 25 with which is associated an arrow 26 and when this signal is illuminated, it indicates that the vehicle is to be backed up.

Obviously, an electric light or bulb must be associated with each of the signals 19, 21, 23, and 25 and these bulbs must be included in electrical circuits which will provide for their being illuminated at the proper time. The respective bulbs and the circuits are depicted in Figure 5.

The lamp for the signal 19 is represented at 27 and the lamp for the signal 21 at 28. These lamps 27 and 28 are included in a circuit which also includes a control switch 29 that is adapted to place either of the lamps 27 or 28 in a closed circuit. The manner in which this switch 29 is operated will be later described in detail. A lamp 30 is provided for the signal 23, and included in the circuit of the lamp 30 is a switch 31 that is automatically operated by the brake pedal 13. Another lamp 32 is provided for the reverse signal 25 and included in the circuit of this lamp is a switch 33 that is mechanically operated by the gearshift 14.

Obviously, it is of the utmost importance that the signals 19 and 21 be selectively operated, one to the exclusion of the other. Thus, the switch 29 is intended to be effective to light only one of these signals at any one time. Moreover this should be carried out automatically as an incident to rotating the steering wheel for making a turn. The switch 29 is shown in Figures 4 and 6 and includes an operating lever 34 which is spring biased by the leaf springs shown at 35 to normally maintain the lever 34 in an "off" or neutral position.

The steering wheel 12 may include any number of spokes that is currently meeting with approval by the motor car manufacturers. Inasmuch as the present trend is to a steering wheel having three spokes, the wheel 12 is so constructed. Two of these spokes are designated 36 and 37 and the switch 29 is mounted with the lever 34 substantially midway therebetween. It will be noted that this lever 34 is pivotally mounted on a center 38 which is offset with respect to the axis of the wheel 12.

Mounted on the spoke 36 is a bracket 39 which carries a hinge arm 40. The hinge connection at 41 is such as to cause the arm 40 to assume a position of substantially forty-five degrees with respect to the plane to the steering wheel 12. However, upward deflection of the arm 40 is permitted by the hinge connection at 41.

In a similar manner, another arm 42 is hingedly connected to a bracket 43 that is carried by the spoke 37. This arm 42 is intended to affect the switch lever 34 to operate the switch so as to illuminate the lamp 27 for the signal 19 as a steering wheel 12 is rotated to make a left turn. In a similar manner the arm 40 is intended to actuate the switch lever 34 to illuminate the lamp 28 for the signal 21 when the steering wheel 12 is rotated to make a right turn.

It will be noted that there is a small amount of play between the free ends of the arms 40 and 42 and the lever 34 which is disposed therebetween. When the steering wheel 12 is rotated, say to the right as for the making of a right turn, the free end of the arm 40 engages the lever 34 adjacent to the end thereof and rotates this lever 34 on the center 38. Inasmuch as the latter is offset with respect to the axis of the wheel 12, continued turning of the wheel 12 will cause the arm 40 to ride off the end of the lever 34. When this happens, the springs at 35 return the lever 34 to its off or neutral position. The wheel 12 may be turned as far as is necessary to make the turn and when it is brought back to position for straight driving the hinge connection at 41 permits the arm 40 to ride over the lever 34 and assume an effective position with respect thereto.

Exactly the same operation takes place when a left turn is made with the exception that the arm 42 is brought into operation rather than the arm 40.

It is evident that when the brake pedal 13 is depressed, the switch 31 will be closed to illuminate the lamp 30 for the signal 23 in a well known manner. Likewise, when the gearshift lever 14 is operated to place the car in reverse, the switch 33 is closed to illuminate the lamp 32 for the back-up signal 25.

While preferred specific embodiments of the invention are hereinbefore set forth, it is to be clearly understood that the invention is not to be limited to the exact mechanisms and devices illustrated and described because various modifications of these details may be provided in putting the invention into practice within the purview of the appended claims.

What is claimed is:

1. In a rear view directional mirror for an automotive vehicle, the combination of: a rectangular framework, a mirror disposed centrally of said framework, and a vehicle operation signal at each of the four corners of said framework.

2. In a rear view directional mirror for an automotive vehicle, the combination of: a rectangular framework, a mirror disposed centrally of said framework, a vehicle operation signal at each of the four corners of said framework, and an indicating arrow associated with each of said signals.

3. In a rear view directional mirror for an automotive vehicle, the combination of: a rectangular framework, a mirror disposed centrally of said framework, a signal at the upper left-hand corner of said framework for indicating the making of a left turn, a signal at the upper right-hand corner of said framework for indicating the making of a right turn, a signal at the lower left-hand corner of said framework for indicating the making of a stop, and a signal at the lower right-hand corner of said framework for indicating reverse.

4. In a rear view directional mirror for an automotive vehicle, the combination of: a rectangular framework, a mirror disposed centrally of said framework, a signal at the upper left-hand corner of said framework for indicating the making of a left turn, a signal at the upper right-hand corner of said framework for indicating the making of a right turn, a signal at the lower left-hand corner of said framework for indicating the making of a stop, a signal at the lower right-hand corner of said framework for indicating reverse, an illuminating lamp associated with each of said signals, a circuit including the lamps for the right and left turn signals, a switch in said circuit adapted to selectively illuminate each of said lamps to the exclusion of the other, and circuits for the others of said lamps.

5. In a rear view directional mirror for an automotive vehicle, the combination of a rectangular framework, a mirror disposed centrally of said framework, a signal at the upper left-hand corner of said framework for indicating the making of a left turn, a signal at the upper right-hand corner of said framework for indicating the making of a right turn, a signal at the lower left-hand corner of said framework for indicating the making of a stop, a signal at the lower right-hand corner of said framework for indicating reverse, an illuminating lamp associated with each of said signals, a circuit including the lamps for the right and left turn signals, a switch in said circuit adapted to selectively illuminate each of said lamps to the exclusion of the other, a circuit including the stop signal lamp, a switch included in said stop signal lamp circuit and adapted to be operatively connected to the brake pedal of a motor vehicle, a circuit in which the reverse signal lamp is included, and a switch in said last-mentioned circuit adapted to be operatively connected to the gearshift lever of the motor vehicle.

6. In mechanism for controlling the operation of directional signals in a rear-vision mirror for an automotive vehicle, the combination of: a steering column, a steering wheel rotatably mounted in said column and including a plurality of spokes, a control switch carried by said column and having a lever extending outwardly therefrom between a pair of said spokes, spring means biasing said lever to normally maintain said switch in off position, a bracket secured to each of said pair of spokes, an arm hingedly carried by each of said brackets and normally assuming a position of substantially forty-five degrees with respect to the plane of said steering wheel, each of said arms being adapted to operatively engage said lever for urging said lever into rotation in one direction, each of said arms also being adapted to ride over said lever in return movement after actuation thereof.

7. In a rear view directional mirror for an automotive vehicle, the combination of a rectangular framework, a mirror disposed centrally of said framework, a signal at one corner of said framework for indicating a turn to the left of said vehicle, a signal at another framework corner for indicating a right turn, a signal at a third corner for indicating the making of a stop, a signal at the fourth framework corner for indicating backing of the vehicle, an illuminating lamp associated with each of said signals, a circuit including the lamp for the right and left turn signals, a switch in said circuit adapted to selectively illuminate each of said right and left signal lamps to the exclusion of the other, and circuits for the other lamps.

MEYER M. MARBEL.

REFERENCES CITED

The following references are of record in the file of this patent:

UNITED STATES PATENTS

| Number | Name | Date |
|---|---|---|
| 1,191,830 | Rousey | July 18, 1916 |
| 1,465,950 | Schiller | Aug. 28, 1923 |
| 1,575,446 | Miller | Mar. 2, 1926 |
| 1,602,094 | Badding | Oct. 5, 1926 |
| 1,647,663 | Pollock | Nov. 1, 1927 |
| 1,713,305 | Stonehill | May 14, 1929 |